United States Patent
Xu et al.

(10) Patent No.: US 9,253,402 B2
(45) Date of Patent: Feb. 2, 2016

(54) VIDEO ANTI-SHAKING METHOD AND VIDEO ANTI-SHAKING DEVICE

(71) Applicant: Spreadtrum Communications (Shanghai) Co., Ltd., Shanghai (CN)

(72) Inventors: Jingming Xu, Shanghai (CN); Hu Wei, Shanghai (CN); Sheng Wu, Shanghai (CN); Bin Jiang, Shanghai (CN); Fuhuei Lin, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 0 days.

(21) Appl. No.: 14/445,158

(22) Filed: Jul. 29, 2014

(65) Prior Publication Data

US 2015/0036006 A1 Feb. 5, 2015

(30) Foreign Application Priority Data

Jul. 31, 2013 (CN) .......................... 2013 1 0330520

(51) Int. Cl.
*H04N 5/232* (2006.01)
*G06T 7/20* (2006.01)

(52) U.S. Cl.
CPC .......... *H04N 5/23267* (2013.01); *G06T 7/2086* (2013.01); *H04N 5/23254* (2013.01)

(58) Field of Classification Search
USPC ...................................... 348/208.6
See application file for complete search history.

(56) References Cited

U.S. PATENT DOCUMENTS

| | | | | |
|---|---|---|---|---|
| 9,025,885 B2 * | 5/2015 | Alpert | ................... | G09K 9/481 348/208.99 |
| 2008/0246848 A1 * | 10/2008 | Tsubaki | ................... | G06T 7/20 348/208.4 |
| 2009/0066800 A1 * | 3/2009 | Wei | ................... | H04N 5/23254 348/208.99 |
| 2011/0234825 A1 * | 9/2011 | Liu | ................... | H04N 5/23248 348/208.5 |
| 2012/0120264 A1 * | 5/2012 | Lee | ........................ | G06T 7/20 348/208.4 |
| 2012/0307086 A1 * | 12/2012 | Jefremov | ........... | H04N 5/23258 348/208.4 |
| 2013/0342714 A1 * | 12/2013 | Zhou | ................... | H04N 5/23267 348/208.2 |

* cited by examiner

*Primary Examiner* — Shahbaz Nazrul
(74) *Attorney, Agent, or Firm* — Cantor Colburn LLP (57) ABSTRACT

A video anti-shaking method and a video anti-shaking device are provided. The method includes: obtaining a first GRMV (global relative motion vector) of a current video frame relative to its previous video frame, and a sequence of second GRMVs of reference video frames relative to their respective previous video frames; calculating a sequence of third GRMVs of the reference video frames relative to the current video frame, respectively, based on the first GRMV and the sequence of second GRMVs; and filtering the sequence of third GRMVs to obtain a motion vector for compensating shaking of the current video frame. Camera shaking and intended motion can be distinguished.

15 Claims, 5 Drawing Sheets

VIDEO ANTI-SHAKING METHOD AND VIDEO ANTI-SHAKING DEVICE

CROSS-REFERENCE TO RELATED APPLICATIONS

The present application claims priority to Chinese patent application No. 201310330520.4, filed on Jul. 31, 2013, and entitled "VIDEO ANTI-SHAKING METHOD AND VIDEO ANTI-SHAKING DEVICE", the entire disclosure of which is incorporated herein by reference.

TECHNICAL FIELD

The present disclosure generally relates to a technical field of video image processing, and more particularly, to a video anti-shaking method and a video anti-shaking device.

BACKGROUND

Normally, when a handheld digital camera/video camera is used for making a digital video, it may be influenced by some factors such as gravity, airflow, etc. As a result, shaking may appear in the video made by the camera/video camera. To improve the quality of videos watched by users, shaking should be reduced when making the videos. Therefore, video anti-shaking techniques are research topics of extreme importance in video field.

Currently, there are two kinds of video anti-shaking techniques which have been commercially used. One is optical anti-shaking and the other one is electronic anti-shaking. In optical anti-shaking, a gyro sensor in a lens is used to detect the motion that occurred in video production. Thereafter, the detected motion is processed to calculate a compensation motion value. The lens will be adjusted based on the compensation motion value to fix the optical path, such that shaking may be reduced. Examples of optical anti-shaking include IS (imagine stabilization) techniques from Canon Corporation and VR (vibration reduction) techniques from Nikon Corporation. Besides, shaking may be suppressed by slightly adjusting a CCD (charge-coupled device).

Regarding to electronic anti-shaking techniques, digital circuits or processors are used to process those already-captured and shaking videos to reduce the shaking contained therein. Following approaches are commonly applied: automatically increasing the ISO (International Standards Organization) sensitivity to reduce the time of exposure, continuously capturing a plurality of images and selecting one with the greatest sharpness and reducing the resolution based on motion estimation and compensation.

SUMMARY

Embodiments of the present disclosure provide a video anti-shaking method and a video anti-shaking device which may distinguish shaking and intended motion of a camera or a filming camera, such that an improved anti-shaking effect may be achieved.

In some embodiment, a video anti-shaking method is provided. The method may include: obtaining a first global relative motion vector (GRMV) and a sequence of second global relative motion vectors, wherein the first global relative motion vector represents a global relative motion vector of a current video frame relative to a video frame which is previous and adjacent to the current video frame, and the sequence of second global relative motion vectors may include one or more second global relative motion vectors each of which represents a global relative motion vector of a reference video frame relative to a video frame which is previous to and adjacent to the reference video frame; calculating a sequence of third global relative motion vectors based on the first global relative motion vector and the sequence of second global relative motion vectors, wherein the sequence of third global relative motion vectors may include one or more third global relative motion vectors each of which represents a global relative motion vector of a reference video frame relative to the current video frame; filtering the sequence of third global relative motion vectors to obtain a motion vector for compensating shaking of the current video frame; and cropping an entire pixel image of the current video frame based on the motion vector for compensating shaking of the current video frame and a predetermined size of an effective pixel image to obtain an image after anti-shaking compensation.

In some embodiments, the reference video frame is one video frame adjacent to the current video frame or one of a set of consecutive video frames adjacent to the current video frame.

In some embodiments, obtaining the first global relative motion vector and the sequence of second global relative motion vectors may include: detecting information of lens motion during video-recording; and calculating the first global relative motion vector and the sequence of second global relative motion vectors based on the information of lens motion.

In some embodiments, obtaining the first global relative motion vector and the sequence of second global relative motion vectors may include: obtaining the current video frame and the reference video frame; calculating a sequence of fourth global relative motion vectors and a sequence of fifth global relative motion vectors using a motion estimation algorithm, respectively, wherein the sequence of fourth global relative motion vectors may include global relative motion vectors of pixel blocks in the current video frame relative to corresponding pixel blocks in a video frame previous to and adjacent to the current video frame, and the sequence of fifth global relative motion vectors may include global relative motion vectors of pixel blocks in the reference video frame relative to corresponding pixel blocks in a video frame previous to and adjacent to the reference video frame; and calculating the first global relative motion vector and the sequence of second global relative motion vectors based on the sequence of fourth global relative motion vectors and the sequence of fifth global relative motion vectors.

In some embodiments, calculating the sequence of fourth global relative motion vectors and the sequence of fifth global relative motion vectors using the motion estimation algorithm may include: calculating the sequence of fourth global relative motion vectors based on all pixel blocks in the current video frame or portions of the pixel blocks in the current video frame; and calculating the sequence of fifth global relative motion vectors based on all pixel blocks in the current video frame or portions of the pixel blocks in the reference video frame.

In some embodiments, calculating a third global relative motion vector of a particular reference video frame, which is previous to the current video frame, based on the first global relative motion vector and the sequence of second global relative motion vectors may include: calculating a summation of second global relative motion vectors of all reference video frames after the particular reference video frame and before the current video frame and the first global relative motion vector of the current video frame; and multiplying the summation with −1 to obtain the third global relative motion vector of the particular reference video frame relative to the current video frame.

In some embodiments, calculating a third global relative motion vector of a particular reference video frame, which is after the current video frame, based on the first global relative motion vector and the sequence of second global relative motion vectors may include: summing up second global relative motion vectors of all reference video frames after the current video frame and before the particular reference video frame and the second global relative motion vector of the particular reference video frame to obtain the third global relative motion vector of the particular reference video frame relative to the current video frame.

In some embodiments, filtering the sequence of third global relative motion vectors may include a low-pass filtering process to filter out high frequency portions in the sequence of third global relative motion vectors.

In some embodiments, cropping the entire pixel image of the current video frame based on the motion vector for compensating shaking of the current video frame and the predetermined size of an effective pixel image to obtain the image after anti-shaking compensation may include: setting an end point of the motion vector for compensating shaking as a compensation center, wherein the motion vector for compensating shaking starts from a geographic center of the entire pixel image of the current video frame; determining a cropping region on the entire pixel image of the current video frame, wherein the cropping region has a geographic center as the compensation center and a size as the size of the effective pixel image; outputting pixels within the cropping region as the image after anti-shaking compensation.

In one embodiment, a video anti-shaking device is provided. The device may include: a first processing unit, adapted to obtaining a first global relative motion vector and a sequence of second global relative motion vectors, wherein the first global relative motion vector represents a global relative motion vector of a current video frame relative to a video frame which is previous and adjacent to the current video frame, and the sequence of second global relative motion vectors may include one or more second global relative motion vectors each of which represents a global relative motion vector of a reference video frame relative to a video frame which is previous to and adjacent to the reference video frame; a second processing unit, adapted to calculating a sequence of third global relative motion vectors based on the first global relative motion vector and the sequence of second global relative motion vectors, wherein the sequence of third global relative motion vectors may include one or more third global relative motion vectors each of which represents a global relative motion vector of a reference video frame relative to the current video frame; a third processing unit, adapted to filtering the sequence of third global relative motion vectors to obtain a motion vector for compensating shaking of the current video frame; and a fourth processing unit, adapted to cropping an entire pixel image of the current video frame based on the motion vector for compensating shaking of the current video frame and a predetermined size of an effective pixel image to obtain an image after anti-shaking compensation.

In some embodiments, the reference video frame is one video frame adjacent to the current video frame or one of a set of consecutive video frames adjacent to the current video frame.

In some embodiments, the first processing unit may include: a lens motion information detecting sub-unit, adapted to detecting information of lens motion during video-recording; and a lens motion information processing sub-unit, adapted to calculating the first global relative motion vector and the sequence of second global relative motion vectors based on the information of lens motion.

In some embodiments, the lens motion information detecting sub-unit is a gyro sensor.

In some embodiments, the first processing unit may include: a video frame receiving sub-unit, adapted to obtaining the current video frame and the reference video frame; a motion estimation calculation sub-unit, adapted to calculating a sequence of fourth global relative motion vectors and a sequence of fifth global relative motion vectors using a motion estimation algorithm, respectively, wherein the sequence of fourth global relative motion vectors may include global relative motion vectors of pixel blocks in the current video frame relative to corresponding pixel blocks in a video frame previous to and adjacent to the current video frame, and the sequence of fifth global relative motion vectors may include global relative motion vectors of pixel blocks in the reference video frame relative to corresponding pixel blocks in a video frame previous to and adjacent to the reference video frame; and a global relative motion vector calculation sub-unit, adapted to calculating the first global relative motion vector and the sequence of second global relative motion vectors based on the sequence of fourth global relative motion vectors and the sequence of fifth global relative motion vectors.

In some embodiments, the third processing unit may include a low-pass filtering sub-unit for filtering out high frequency portions in the sequence of third global relative motion vectors.

Embodiments of the present disclosure may have following advantages:

In the above described methods, the sequence of third global relative motion vectors are filtered to obtain the motion vector for compensating shaking of the current video frame. In other words, the filtering process may tell high frequency parts and low frequency parts in the sequence of third global relative motion vectors apart, such that shaking and intended motion of the camera/filming camera can be distinguished. As such, anti-shaking effect may be improved.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 1:
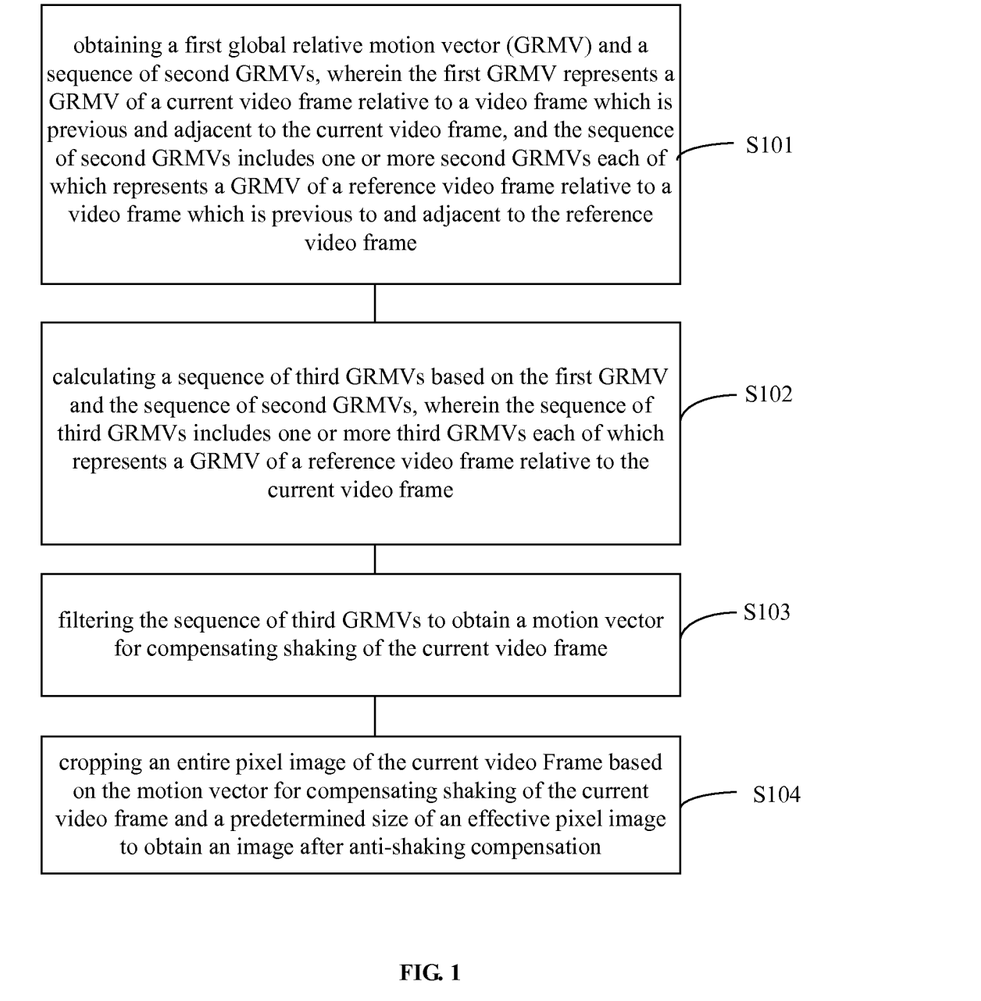
FIG. 1 schematically illustrates a flow chart of a video anti-shaking method according to one or more embodiments of the present disclosure.

FIG. 1 schematically illustrates a flow chart of a video anti-shaking method according to one or more embodiments of the present disclosure. There are several steps S101, S102, S103 and S104 illustrated in FIG. 1, which will be illustrated in detail hereinafter.

First, referring to FIG. 1, perform step S101: obtaining a first global relative motion vector (GRMV) and a sequence of second GRMVs, wherein the first GRMV represents a GRMV of a current video frame relative to a video frame which is previous and adjacent to the current video frame, and the sequence of second GRMVs includes one or more second GRMVs each of which represents a GRMV of a reference video frame relative to a video frame which is previous to and adjacent to the reference video frame.

In some embodiments, the sequence of second GRMVs may include only one second GRMV corresponding to only one reference video frame which is adjacent to the current video frame, either before or after the video frame. In some embodiments, there may be a plurality of second GRMVs respectively corresponding to a plurality of reference video frames. In some embodiments, the plurality of reference video frames may be a set of consecutive video frames adjacent to the current video frame, either before or after the video frame. In some embodiments, the plurality of reference video frames may be divided into two sets of consecutive video frames respectively queuing on two sides of the current video frame, and each set of which is adjacent to the current video frame. Summing up the above embodiments, the reference video frame may be one video frame adjacent to the current video frame or one of a set of consecutive video frames adjacent to the current video frame. In some embodiments, the current video frame and the reference video frame may be subject to sampling reduction or resolution reduction.

The current video frame, the reference video frame(s), the first GRMV and the second GRMV(s) will be illustrated in detail with reference to FIG. 2 hereinafter.

Figure 2:
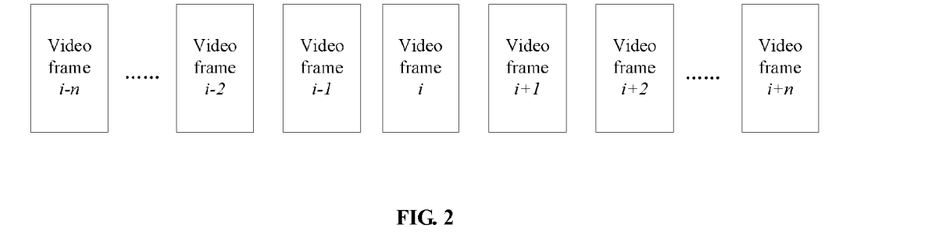
FIG. 2 schematically illustrates a sequence of video frames according to one or more embodiments of the present disclosure.

As shown in FIG. 2, there are assumed totally 2n+1 video frames and video frame i is taken as the current frame. Under such circumstance, any number of consecutive video frame(s) adjacent and prior to the video frame i and/or any number of consecutive video frame(s) adjacent to and after the video frame i may be taken as the reference video frames in following computation.

Suppose that the current video frame is the video frame i, then the first GRMV is a GRMV of the video frame i relative to a video frame i−1.

Further, assume that the video frame i−1 is one of the reference frames, then the second GRMV of the video frame i−1 is a GRMV of the video frame i−1 relative to a video frame i−2. Similarly, assume that a video frame i−k is one of the reference frames, then the second GRMV of the video frame i−k is a GRMV of the video frame i−k relative to a video frame i−(k+1).

Figure 3:
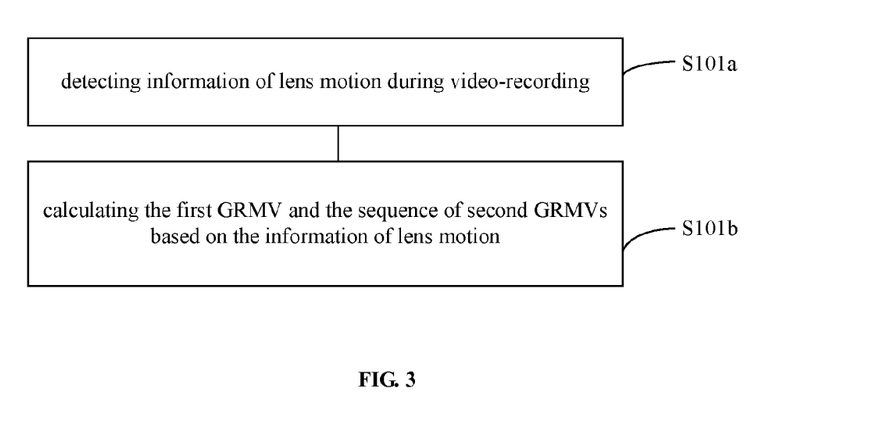
FIG. 3 schematically illustrates a flow chart of a method for obtaining a first GRMV and a sequence of second GRMVs according to one or more embodiments of the present disclosure.

Referring to FIG. 3, in some embodiments, obtaining the first GRMV and the sequence of second GRMVs may include step S101a and step S101b.

First, perform step S101a, detecting information of lens motion during video-recording. In some embodiments, the information of lens motion during video-recording may be detected using a gyro sensor. In some embodiments, other applicable devices may be used to detect the information of lens motion during video-recording.

Thereafter, perform step S101b, calculating the first GRMV and the sequence of second GRMVs based on the information of lens motion. In some embodiments, calculating the first GRMV and the sequence of second GRMVs based on the information of lens motion may be implemented using common calculation methods well-known in the art, which will not be illustrated in detail here.

After the first GRMV and the sequence of second GRMVs are obtained, referring back to FIG. 1, perform step S102, calculating a sequence of third GRMVs based on the first GRMV and the sequence of second GRMVs, wherein the sequence of third GRMVs includes one or more third GRMVs each of which represents a GRMV of a reference video frame relative to the current video frame.

In some embodiments, if a particular reference video frame whose third GRMV is to be calculated is previous to the current video frame, calculating the third GRMV of such particular reference video frame based on the first GRMV and the sequence of second GRMVs may include: calculating a summation of second GRMVs of all the reference video frames which are after the particular video frame and prior to the current video frame; and multiplying the summation with −1 to obtain the GRMV of the particular reference video frame relative to the current video frame.

Hereinafter, the above described calculation of the third GRMVs will be illustrated in detail with reference to FIG. 2.

Referring to FIG. 2, if the particular reference video frame is the video frame i−1 and the current video frame is the video frame i, the third GRMV of the video frame i−1 shall be a GRMV of the video frame i−1 relative to the video frame i. Specifically, the third GRMV of the video frame i−1 equals to a product of the first GRMV of the video frame i and −1. If the particular reference video frame is the video frame i−2 and the current video frame is the video frame i, the third GRMV of the video frame i−2 shall be a GRMV of the video frame i−2 relative to the video frame i. Specifically, the third GRMV of the video frame i−2 equals to a product of −1 and a summation of the first GRMV of the video frame i and the second GRMV of the video frame i−1. If the particular reference video frame is the video frame i−3 and the current video frame is the video frame i, the third GRMV of the video frame i−3 shall be a GRMV of the video frame i−3 relative to the video frame i. Specifically, the third GRMV of the video frame i−3 equals to a product of −1 and a summation of the first GRMV of the video frame i, the second GRMV of the video frame i−1 and the second GRMV of the video frame i−2. By parity of reasoning, if the particular reference video frame whose third GRMV is to be calculated is a video frame i−n and the current video frame is the video frame i, the third GRMV of the video frame i−n shall be a GRMV of the video frame i−n relative to the video frame i. Specifically, the third GRMV of the video frame i−n equals to a product of −1 and a summation of the first GRMV of the video frame i and second GRMVs of all the video frames from video frame i−1 to video frame i−(n−1).

Summing up the above, the sequence of second GRMVs of the reference video frames may be represented as $M_k$, where $i-n<=k<=i+n$. The current video frame is the video frame i and the first GRMV of the video frame i may be represented as $M_i$. It can be deduced that, when $i-n+1<=j<=i$, the third GRMV of the video frame j (represented as M) is a GRMV of the video frame j relative to the current video frame i, calculated based on an equation: $M_j = -(\Sigma_{k=i-1}^{i-(j-1)} M_k + M_i)$. Since the GRMV includes a horizontal component $M_H$ and a vertical component $M_V$, when $i-n+1<=j<=i$, the horizontal component of the third GRMV of the video frame j may be calculated based on an equation: $M_{H,j} = -(\Sigma_{k=i-1}^{i-(j-1)} M_{H,k} + M_{H,i})$, and the vertical component of the third GRMV of the video frame j may be calculated based on an equation: $M_{V,j} = -(\Sigma_{k=i-1}^{i-(j-1)} M_{V,k} + M_{V,i})$.

In some embodiments, if a particular reference video frame whose third GRMV is to be calculated is after the current video frame, calculating the third GRMV of such particular reference video frame based on the first GRMV and the sequence of second GRMVs may include: calculating a summation of second GRMVs of all the reference video frames between the particular video frame and the current video frame plus a second GRMV of the particular reference video frame to obtain the GRMV of the particular reference video frame relative to the current video frame.

Hereinafter, the above described calculation of the third GRMVs (for reference video frames after the current frame) will be illustrated in detail with reference to FIG. 2.

Referring to FIG. 2, if the particular reference video frame is the video frame i+1 and the current video frame is the video frame i, the third GRMV of the video frame i+1 shall be a GRMV of the video frame i+1 relative to the video frame i. Specifically, the third GRMV of the video frame i+1 equals to the second GRMV of the video frame i+1. If the particular reference video frame is the video frame i+2 and the current video frame is the video frame i, the third GRMV of the video frame i+2 shall be a GRMV of the video frame i+2 relative to the video frame i. Specifically, the third GRMV of the video frame i+2 equals to a summation of the second GRMV of the video frame i+1 and the second GRMV of the video frame i+2. If the particular reference video frame is the video frame i+3 and the current video frame is the video frame i, the third GRMV of the video frame i+3 shall be a GRMV of the video frame i+3 relative to the video frame i. Specifically, the third GRMV of the video frame i+3 equals to a summation of the second GRMV of the video frame i+1, the second GRMV of the video frame i+2 and the second GRMV of the video frame i+3. By parity of reasoning, if the particular reference video frame whose third GRMV is to be calculated is a video frame i+n and the current video frame is the video frame i, the third GRMV of the video frame i+n shall be a GRMV of the video frame i+n relative to the video frame i. Specifically, the third GRMV of the video frame i+n equals to a summation of the second GRMVs of all the video frames from video frame i+1 to video frame i+n).

Summing up the above, the sequence of second GRMVs of the reference video frames may be represented as $M_k$, where $i-n<=k<=i+n$. The current video frame is the video frame i and the first GRMV of the video frame i may be represented as $M_i$. It can be deduced that, when $i<j<=i+n+1$, the third GRMV of the video frame j (represented as $M_j$) is a GRMV of the video frame j relative to the current video frame i, calculated based on an equation: $M_j = \Sigma_{k=i+1}^{j} M_k$. Similarly, since the GRMV includes a horizontal component $M_H$ and a vertical component $M_V$, when $i-n<=k<=i+n$, the horizontal component of the third GRMV of the video frame j may be calculated based on an equation: $M_{H,j} = \Sigma_{k=i-1}^{j} M_{H,k}$, and the vertical component of the third GRMV of the video frame j may be calculated based on an equation: $M_{V,j} = \Sigma_{k=i+1}^{j} M_{V,k}$.

Thereafter, referring back to FIG. 1, perform step S103, filtering the sequence of third GRMVs to obtain a motion vector for compensating shaking of the current video frame.

In some embodiments, the filtering may be implemented using low-pass filtering to filter high frequency portions in the sequence of third GRMVs. Specifically, a Gaussian filtering in time domain may be used as the low-pass filtering.

It should be noted that, as intended motion of the camera may generally maintain continuity over time, it may have a frequency lower than that of the shaking. In other words, camera shaking has a frequency higher than that of its intended motion. Therefore, the low-pass filtering can filter the portions with relatively high frequency, which corresponding to the shaking, such that video quality may be improved. For example, when Gaussian filtering in time domain is used, the Gaussian factor may be as follows:

$$G(i) = 1/\text{sqrt}(2*pi*\sigma) * \exp(-(i^2)/(2*\sigma^2)),$$

where $\sigma = \text{sqrt}(g)$, $-g <= i <= g$.

If g has a greater value, the low-pass filtering may have a better effect.

Thereafter, referring still to FIG. 1, perform step S104, cropping an entire pixel image of the current video frame based on the motion vector for compensating shaking of the current video frame and a predetermined size of an effective pixel image to obtain an image after anti-shaking compensation.

Figure 5:
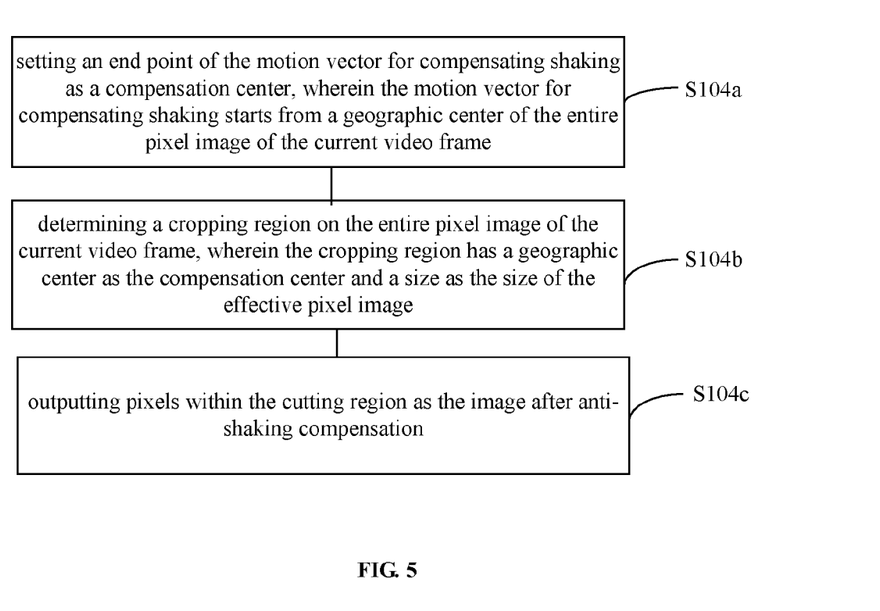
FIG. 5 schematically illustrates a flow chart of a method for obtaining an image after anti-shaking processing according to one or more embodiments of the present disclosure.

Referring to FIG. 5, in some embodiments, the step S104 may include: step S104a, setting an end point of the motion vector for compensating shaking as a compensation center, wherein the motion vector for compensating shaking starts from a geographic center of the entire pixel image of the current video frame; step S104b, determining a cropping region on the entire pixel image of the current video frame, wherein the cropping region has a geographic center as the compensation center and a size as the size of the effective pixel image; and step S104c, outputting pixels within the cropping region as the image after anti-shaking compensation.

First, referring to FIG. 1, perform step S101: obtaining a first GRMV and a sequence of second GRMVs, wherein the first GRMV represents a GRMV of a current video frame relative to a video frame which is previous and adjacent to the current video frame, and the sequence of second GRMVs includes one or more second GRMVs each of which represents a GRMV of a reference video frame relative to a video frame which is previous to and adjacent to the reference video frame.

The reference video frame may be one video frame adjacent to the current video frame or one of a set of consecutive video frames which are adjacent to the current video frame. In some embodiments, the current video frame and the reference video frame may be subject to sampling reduction or resolution reduction.

Similarly, the current video frame, the reference video frame(s), the first GRMV and the second GRMV(s) will be illustrated in detail with reference to FIG. 2 hereinafter.

As shown in FIG. 2, there are assumed totally 2n+1 video frames and video frame i is taken as the current frame. Under such circumstance, any number of consecutive video frame(s) adjacent and prior to the video frame i and/or any number of consecutive video frame(s) adjacent to and after the video frame i may be taken as the reference video frames in following computation.

Suppose that the current video frame is the video frame i, then the first GRMV is a GRMV of the video frame i relative to a video frame i−1.

Further, assume that the video frame i−1 is one of the reference frames, then the second GRMV of the video frame i−1 is a GRMV of the video frame i−1 relative to a video frame i−2. Similarly, assume that a video frame i−k is one of the reference frames, then the second GRMV of the video frame i−k is a GRMV of the video frame i−k relative to a video frame i−(k+1).

Figure 4:
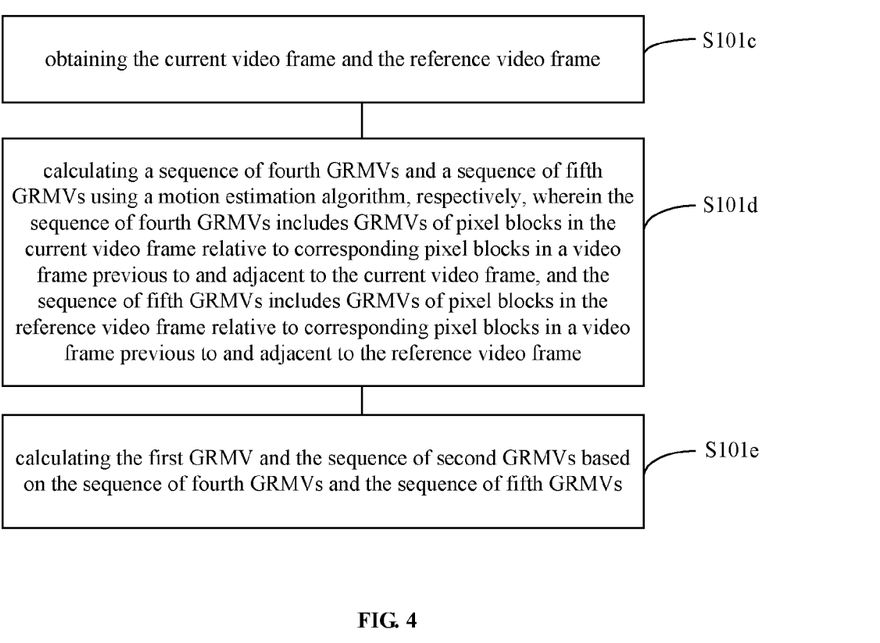
FIG. 4 schematically illustrates a flow chart of a method for obtaining a first GRMV and a sequence of second GRMVs according to one or more embodiments of the present disclosure.

Referring to FIG. 4, in some embodiments, obtaining the first GRMV and one of the second GRMVs may include step S101c, step S101d and step S101e.

First, perform step S101c, obtaining the current video frame and the reference video frame.

In some embodiments, the current video frame and the reference video frame are required to be obtained and stored, such that they can be invoked in subsequent calculation.

Thereafter, perform step S101d, calculating a sequence of fourth GRMVs and a sequence of fifth GRMVs using a motion estimation algorithm, respectively, wherein the sequence of fourth GRMVs includes GRMVs of pixel blocks in the current video frame relative to corresponding pixel blocks in a video frame previous to and adjacent to the current video frame, and the sequence of fifth GRMVs includes GRMVs of pixel blocks in the reference video frame relative to corresponding pixel blocks in a video frame previous to and adjacent to the reference video frame.

In some embodiments, the motion estimation algorithm may be a motion estimation algorithm based on video compression, in which motion estimations are implemented using image blocks or macro blocks as search blocks, such that relative motion vectors of each block or macro block in the image can be obtained. For example, motion search, diamond search or other search approaches in standards like MPEG (moving pictures experts group), H26X, or the like.

In some embodiments, in the motion estimation algorithm, it may be implemented that each block or macro block in the image is searched. In some embodiments, some of the blocks or macro blocks with selected uniform gaps may be searched. In some embodiments, blocks or macro blocks with strong marginal information or feature information may be searched. Common image marginal detecting methods may include Sobel algorithm, Canny algorithm, and the like.

In conclusion, in some embodiments, the sequence of fourth GRMVs may be calculated based on all the pixel blocks or portions of the pixel blocks in the current video frame. Similarly, in some embodiments, the sequence of fifth GRMVs may be calculated based on all the pixel blocks or portions of the pixel blocks in the reference video frame.

Thereafter, perform step S101e, calculating the first GRMV and the sequence of second GRMVs based on the sequence of fourth GRMVs and the sequence of fifth GRMVs.

Since calculating the first GRMV of the current video frame based on the sequence of fourth GRMVs is similar to calculating the sequence of second GRMVs of the reference video frame based on the sequence of fifth GRMVs, how to calculate the first GRMV of the current video frame based on the sequence of fourth GRMVs will be illustrated in detail hereinafter.

Since the GRMVs include horizontal components and vertical components, and calculating the horizontal component of the first GRMV is similar to calculating the vertical component of the first GRMV, how to calculate the horizontal component of the first GRMV of the current video frame will be illustrated in detail hereinafter.

For example, in some embodiments, by using the motion estimation algorithm, a sequence $M_b$ (b=0, 1, . . . , L−1) of GRMVs of L pixel blocks in the current video frame may be obtained. That is to say, the sequence of fourth GRMVs is the sequence $M_b$ (b=0, 1, . . . , L−1), in which the horizontal component sequence is $M_{H,b}$ (b=0, 1, . . . , L−1), and the vertical component sequence is $M_{V,b}$ (b=0, 1, . . . , L−1). Accordingly, calculating the horizontal component of the first GRMV of the current video frame, which is represent as $M_H$, based on the sequence of fourth GRMVs of the current video frame may be implemented as follows: selecting a maximum value MAX($M_{H,b}$) and a minimum value MIN($M_{H,b}$) in the horizontal component sequence $M_{H,b}$ (b=0, 1, . . . , L−1); uniformly dividing a section (MAX($M_{H,b}$), MIN($M_{H,b}$)) into s sub-section, where s may be a predetermined constant which can be selected based on practical requirements, for example, s=8; finding a sub-section S with most vertical components; within the sub-section S, finding a horizontal component P with the greatest number of corresponding horizontal components, where the number of the horizontal components corresponding to the horizontal component P is assumed as n(P); deducing a greatest possible section S1 which meets following requirements, P∈S1, Q∈S1 and n(Q)>=c*n(p), where c is a predetermined constant which can be selected based on practical requirements, for example, c=0.25; calculating a weighted sum of all the horizontal components within the section S1 to obtain the first GRMV $M_H$ of the current video frame, i.e., $M_H = \Sigma(W_{H,b} * M_{H,b})$, where each weight factor $W_{H,b}$ is a ratio of the number of corresponding horizontal components $M_{H,b}$ to the total number of horizontal components in the section S1.

As described above, similarly, the vertical component of the first GRMV of the current video frame can be calculated based on the sequence of fourth GRMVs using the above methods. Similarly, the sequence of second GRMVs can be calculated using the method for calculating the first GRMV.

After the first GRMV and the sequence of second GRMVs are obtained, referring back to FIG. 1, perform step S102, step S103 and step S104 to obtain an image after anti-shaking processing. Details of the steps S102, S103 and S104 may be obtained by referring to above embodiments, which will not be illustrated here.

Figure 6:
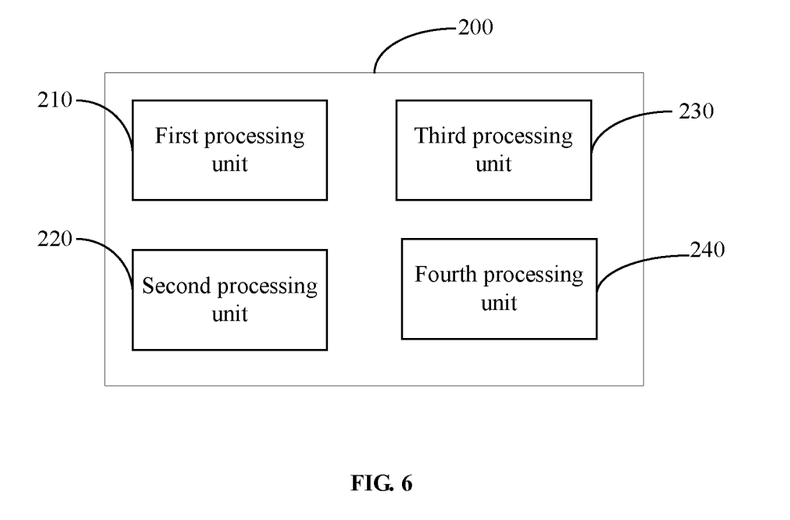
FIG. 6 schematically illustrates a block diagram of a video anti-shaking device according to one or more embodiments of the present disclosure.

A video anti-shaking device is provided in one or more embodiments of the present disclosure. Referring to FIG. 6, in some embodiments, the device may include: a first processing unit 210 adapted to obtaining a first GRMV and a sequence of second GRMVs, wherein the first GRMV represents a GRMV of a current video frame relative to a video frame which is previous and adjacent to the current video frame, and the sequence of second GRMVs includes one or more second GRMVs each of which represents a GRMV of a reference video frame relative to a video frame which is previous to and adjacent to the reference video frame; a second processing unit 220, adapted to calculating a sequence of third GRMVs based on the first GRMV and the sequence of second GRMVs, wherein the sequence of third GRMVs includes one or more third GRMVs each of which represents a GRMV of a reference video frame relative to the current video frame; a third processing unit 230, adapted to filtering the sequence of third GRMVs to obtain a motion vector for compensating shaking of the current video frame; and a fourth processing unit 240, adapted to cropping an entire pixel image of the current video frame based on the motion vector for compensating shaking of the current video frame and a predetermined size of an effective pixel image to obtain an image after anti-shaking compensation.

In some embodiments, the reference video frame may be one video frame adjacent to the current video frame or one of a set of consecutive video frames adjacent to the current video frame.

Figure 7:
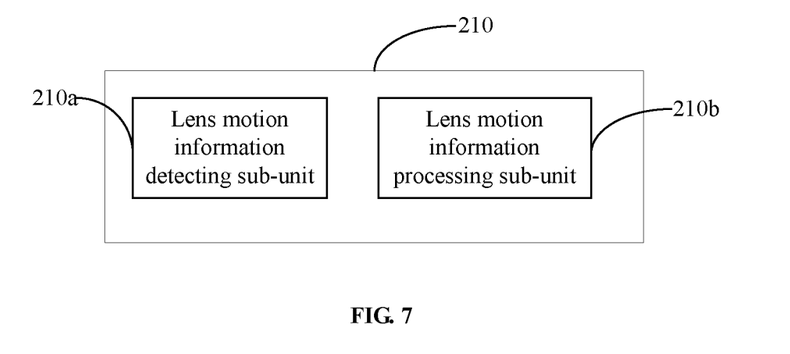
FIG. 7 schematically illustrates a block diagram of a first processing unit according to one or more embodiments of the present disclosure.

In some embodiments, referring to FIG. 7, the first processing unit 210 may include: a lens motion information detecting sub-unit 210a, adapted to detecting information of lens motion during video-recording; and a lens motion information processing sub-unit 210b, adapted to calculating the first GRMV and the sequence of second GRMVs based on the information of lens motion. In some embodiments, the lens motion information detecting sub-unit may be a gyro sensor.

Figure 8:
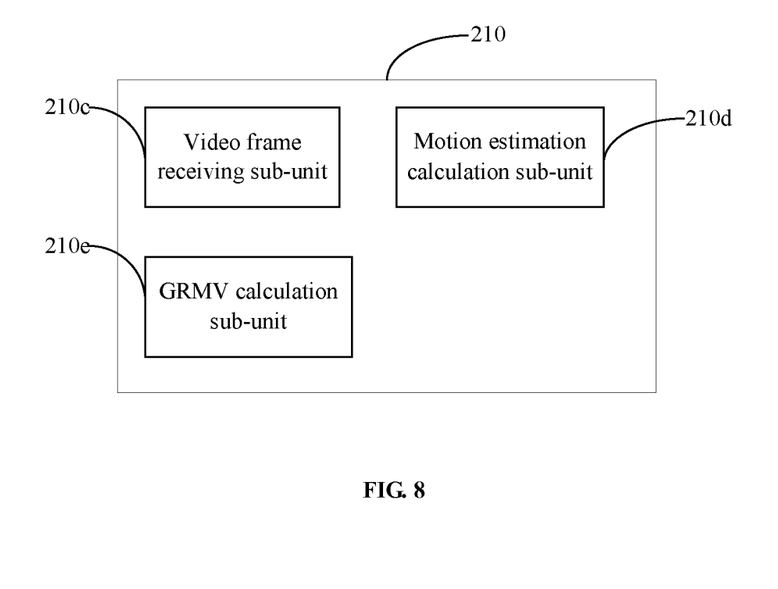
FIG. 8 schematically illustrates a block diagram of a first processing unit according to one or more embodiments of the present disclosure.

In some embodiments, referring to FIG. 8, the first processing unit 210 may include: a video frame receiving sub-unit 201c, adapted to obtaining the current video frame and the reference video frame; a motion estimation calculation sub-unit 210d, adapted to calculating a sequence of fourth GRMVs and a sequence of fifth GRMVs using a motion estimation algorithm, respectively, wherein the sequence of fourth GRMVs includes GRMVs of pixel blocks in the current video frame relative to corresponding pixel blocks in a video frame previous to and adjacent to the current video frame, and the sequence of fifth GRMVs includes GRMVs of pixel blocks in the reference video frame relative to corresponding pixel blocks in a video frame previous to and adjacent to the reference video frame; and a GRMV calculation sub-unit 210e, adapted to calculating the first GRMV and the sequence of second GRMVs based on the sequence of fourth GRMVs and the sequence of fifth GRMVs.

In some embodiments, the third processing unit 230 may include a low-pass filtering sub-unit for filtering out high frequency portions in the sequence of third GRMVs (not shown in figures).

In some embodiments, the device may further include a storage unit (not shown in figures) for storing the first GRMV of the current video frame. The first GRMV of the current video frame may be used as a second GRMV, when the current video frame is used as a reference video frame for a video frame sequenced thereafter.

The disclosure is disclosed, but not limited, by preferred embodiments as above. Based on the disclosure of the disclosure, those skilled in the art can make any variation and modification without departing from the scope of the disclosure. Therefore, any simple modification, variation and polishing based on the embodiments described herein is within the scope of the present disclosure.

What is claimed is:

1. A video anti-shaking method, comprising:
   obtaining a first global relative motion vector and a sequence of second global relative motion vectors, wherein the first global relative motion vector represents a global relative motion vector of a current video frame relative to a video frame which is previous and adjacent to the current video frame, and the sequence of second global relative motion vectors comprises one or more second global relative motion vectors each of which represents a global relative motion vector of a reference video frame relative to a video frame which is previous to and adjacent to the reference video frame;
   calculating a sequence of third global relative motion vectors based on the first global relative motion vector and the sequence of second global relative motion vectors, wherein the sequence of third global relative motion vectors comprises one or more third global relative motion vectors each of which represents a global relative motion vector of a reference video frame relative to the current video frame;
   filtering the sequence of third global relative motion vectors to obtain a motion vector for compensating shaking of the current video frame; and
   cropping an entire pixel image of the current video frame based on the motion vector for compensating shaking of the current video frame and a predetermined size of an effective pixel image to obtain an image after anti-shaking compensation.

2. The video anti-shaking method according to claim 1, wherein the reference video frame is one video frame adjacent to the current video frame or one of a set of consecutive video frames adjacent to the current video frame.

3. The video anti-shaking method according to claim 1, wherein obtaining the first global relative motion vector and the sequence of second global relative motion vectors comprises:
   detecting information of lens motion during video-recording; and
   calculating the first global relative motion vector and the sequence of second global relative motion vectors based on the information of lens motion.

4. The video anti-shaking method according to claim 1, wherein obtaining the first global relative motion vector and the sequence of second global relative motion vectors comprises:
   obtaining the current video frame and the reference video frame;
   calculating a sequence of fourth global relative motion vectors and a sequence of fifth global relative motion vectors using a motion estimation algorithm, respectively, wherein the sequence of fourth global relative motion vectors comprises global relative motion vectors of pixel blocks in the current video frame relative to corresponding pixel blocks in a video frame previous to and adjacent to the current video frame, and the sequence of fifth global relative motion vectors comprises global relative motion vectors of pixel blocks in the reference video frame relative to corresponding pixel blocks in a video frame previous to and adjacent to the reference video frame; and
   calculating the first global relative motion vector and the sequence of second global relative motion vectors based on the sequence of fourth global relative motion vectors and the sequence of fifth global relative motion vectors.

5. The video anti-shaking method according to claim 4, wherein calculating the sequence of fourth global relative motion vectors and the sequence of fifth global relative motion vectors using the motion estimation algorithm comprises:
   calculating the sequence of fourth global relative motion vectors based on all pixel blocks in the current video frame or portions of the pixel blocks in the current video frame; and
   calculating the sequence of fifth global relative motion vectors based on all pixel blocks in the current video frame or portions of the pixel blocks in the reference video frame.

6. The video anti-shaking method according to claim 1, wherein calculating a third global relative motion vector of a particular reference video frame, which is previous to the current video frame, based on the first global relative motion vector and the sequence of second global relative motion vectors comprises:
   calculating a summation of second global relative motion vectors of all reference video frames after the particular reference video frame and before the current video frame and the first global relative motion vector of the current video frame; and multiplying the summation with −1 to obtain the third global relative motion vector of the particular reference video frame relative to the current video frame.

7. The video anti-shaking method according to claim 1, wherein calculating a third global relative motion vector of a particular reference video frame, which is after the current video frame, based on the first global relative motion vector and the sequence of second global relative motion vectors comprises:

summing up second global relative motion vectors of all reference video frames after the current video frame and before the particular reference video frame and the second global relative motion vector of the particular reference video frame to obtain the third global relative motion vector of the particular reference video frame relative to the current video frame.

8. The video anti-shaking method according to claim 1, wherein filtering the sequence of third global relative motion vectors comprises a low-pass filtering process to filter out high frequency portions in the sequence of third global relative motion vectors.

9. The video anti-shaking method according to claim 1, wherein cropping the entire pixel image of the current video frame based on the motion vector for compensating shaking of the current video frame and the predetermined size of an effective pixel image to obtain the image after anti-shaking compensation comprises:

setting an end point of the motion vector for compensating shaking as a compensation center, wherein the motion vector for compensating shaking starts from a geographic center of the entire pixel image of the current video frame;

determining a cropping region on the entire pixel image of the current video frame, wherein the cropping region has a geographic center as the compensation center and a size as the size of the effective pixel image; and outputting pixels within the cropping region as the image after anti-shaking compensation.

10. A video anti-shaking device, comprising:

a first processing unit, adapted to obtaining a first global relative motion vector and a sequence of second global relative motion vectors, wherein the first global relative motion vector represents a global relative motion vector of a current video frame relative to a video frame which is previous and adjacent to the current video frame, and the sequence of second global relative motion vectors comprises one or more second global relative motion vectors each of which represents a global relative motion vector of a reference video frame relative to a video frame which is previous to and adjacent to the reference video frame;

a second processing unit, adapted to calculating a sequence of third global relative motion vectors based on the first global relative motion vector and the sequence of second global relative motion vectors, wherein the sequence of third global relative motion vectors comprises one or more third global relative motion vectors each of which represents a global relative motion vector of a reference video frame relative to the current video frame;

a third processing unit, adapted to filtering the sequence of third global relative motion vectors to obtain a motion vector for compensating shaking of the current video frame; and a fourth processing unit, adapted to cropping an entire pixel image of the current video frame based on the motion vector for compensating shaking of the current video frame and a predetermined size of an effective pixel image to obtain an image after anti-shaking compensation.

11. The video anti-shaking device according to claim 10, wherein the reference video frame is one video frame adjacent to the current video frame or one of a set of consecutive video frames adjacent to the current video frame.

12. The video anti-shaking device according to claim 10, wherein the first processing unit comprises:

a lens motion information detecting sub-unit, adapted to detecting information of lens motion during video-recording; and a lens motion information processing sub-unit, adapted to calculating the first global relative motion vector and the sequence of second global relative motion vectors based on the information of lens motion.

13. The video anti-shaking device according to claim 12, wherein the lens motion information detecting sub-unit is a gyro sensor.

14. The video anti-shaking device according to claim 10, wherein the first processing unit comprises:

a video frame receiving sub-unit, adapted to obtaining the current video frame and the reference video frame;

a motion estimation calculation sub-unit, adapted to calculating a sequence of fourth global relative motion vectors and a sequence of fifth global relative motion vectors using a motion estimation algorithm, respectively, wherein the sequence of fourth global relative motion vectors comprises global relative motion vectors of pixel blocks in the current video frame relative to corresponding pixel blocks in a video frame previous to and adjacent to the current video frame, and the sequence of fifth global relative motion vectors comprises global relative motion vectors of pixel blocks in the reference video frame relative to corresponding pixel blocks in a video frame previous to and adjacent to the reference video frame; and a global relative motion vector calculation sub-unit, adapted to calculating the first global relative motion vector and the sequence of second global relative motion vectors based on the sequence of fourth global relative motion vectors and the sequence of fifth global relative motion vectors.

15. The video anti-shaking device according to claim 10, wherein the third processing unit comprises a low-pass filtering sub-unit for filtering out high frequency portions in the sequence of third global relative motion vectors.

\* \* \* \* \*